(12) United States Patent
Quade

(10) Patent No.: US 7,181,877 B2
(45) Date of Patent: Feb. 27, 2007

(54) INFLATABLE APPARATUS FOR DISPLAYING VISUAL IMAGES

(75) Inventor: William Patrick Quade, Macquarie (AU)

(73) Assignee: Airsine Holdings Pty. Limited, Canberra (AU)

( * ) Notice: Subject to any disclaimer, the term of this patent is extended or adjusted under 35 U.S.C. 154(b) by 0 days.

(21) Appl. No.: 10/433,301

(22) PCT Filed: Dec. 4, 2001

(86) PCT No.: PCT/AU01/01565

§ 371 (c)(1),
(2), (4) Date: Jun. 3, 2003

(87) PCT Pub. No.: WO02/47057

PCT Pub. Date: Jun. 13, 2002

(65) Prior Publication Data

US 2004/0035034 A1    Feb. 26, 2004

(30) Foreign Application Priority Data

| Dec. 5, 2000 | (AU) | ................................ | PR1888 |
| Apr. 2, 2001 | (AU) | ................................ | PR4153 |
| Aug. 27, 2001 | (AU) | ................................ | PR7286 |

(51) Int. Cl.
*G09F 15/00* (2006.01)

(52) U.S. Cl. .......................................... 40/610; 52/2.21
(58) Field of Classification Search .................. 40/212, 40/214, 217, 606.11, 606.18, 610, 611.01, 40/736; 446/220, 221; 297/DIG. 8; 135/116, 135/137; 52/2.22, 2.17, 2.24
See application file for complete search history.

(56) References Cited

U.S. PATENT DOCUMENTS 2,561,016 A * 7/1951 Ford et al. .................... 40/603

(Continued)

FOREIGN PATENT DOCUMENTS

EP    1 006 504    6/2000

(Continued)

OTHER PUBLICATIONS

"EP 01 99 9933: Supplementary European Search Report", Jul. 7, 2006.

*Primary Examiner*—Cassandra Davis
(74) *Attorney, Agent, or Firm*—Knobbe, Martens, Olson & Bear, LLP

(57) ABSTRACT

Apparatus for displaying a visual image includes a device having an inflatable main body and a base portion. The main body is formed from tubular members which define a predetermined shape when inflated, providing at least one display face for displaying a visual image. The base portion stabilizes the device.

9 Claims, 7 Drawing Sheets

U.S. PATENT DOCUMENTS

| | | | | |
|---|---|---|---|---|
| 3,457,684 A | * | 7/1969 | Wood, Jr. | 52/2.21 |
| 4,179,832 A | * | 12/1979 | Lemelson | 40/540 |
| 4,309,851 A | * | 1/1982 | Flagg | 52/2.21 |
| 4,369,591 A | | 1/1983 | Vicino | |
| 4,573,933 A | | 3/1986 | Cameron | |
| 4,607,655 A | * | 8/1986 | Wagner et al. | 52/2.19 |
| 4,776,121 A | | 10/1988 | Vicino | |
| 5,269,623 A | * | 12/1993 | Hanson | 404/6 |
| 5,345,961 A | * | 9/1994 | Yercha et al. | 135/87 |
| 5,402,591 A | * | 4/1995 | Lee | 40/610 |
| 5,570,544 A | * | 11/1996 | Hale et al. | 52/2.18 |
| 5,586,594 A | * | 12/1996 | Shapoff | 160/135 |
| 5,678,357 A | | 10/1997 | Rubio et al. | |
| 6,008,938 A | * | 12/1999 | Suehle et al. | 359/443 |
| 6,240,666 B1 | * | 6/2001 | Apel et al. | 40/610 |

FOREIGN PATENT DOCUMENTS

| | | |
|---|---|---|
| GB | 2 172 509 A | 9/1986 |
| GB | 2 335 299 A | 9/1999 |

\* cited by examiner

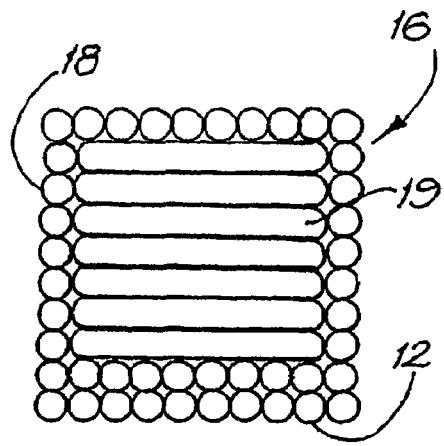 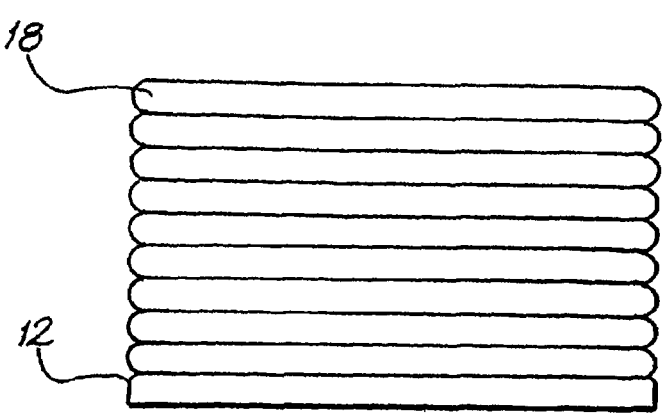
FIG. 7A    FIG. 7B
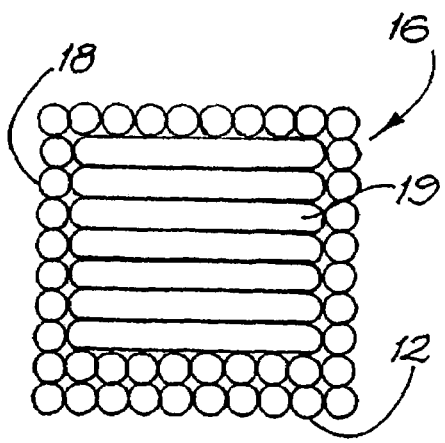 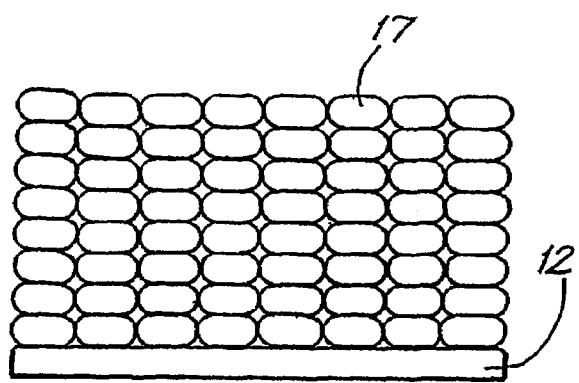
FIG. 8A    FIG. 8B
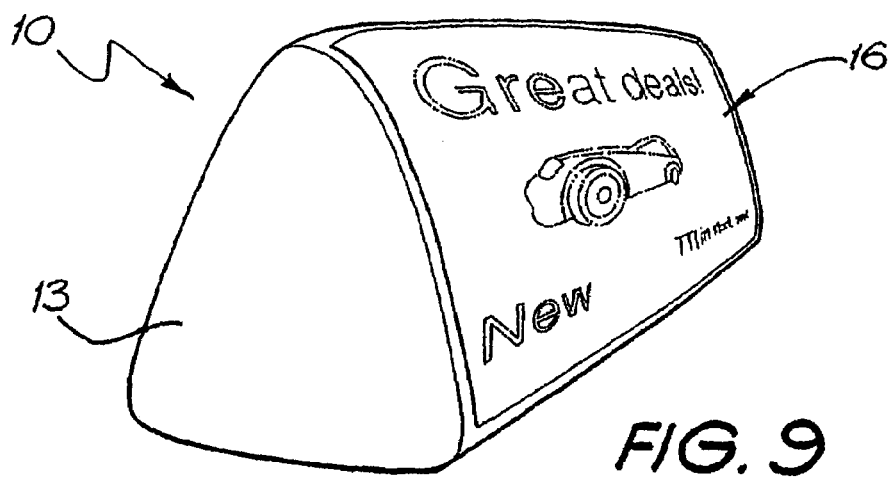
FIG. 9

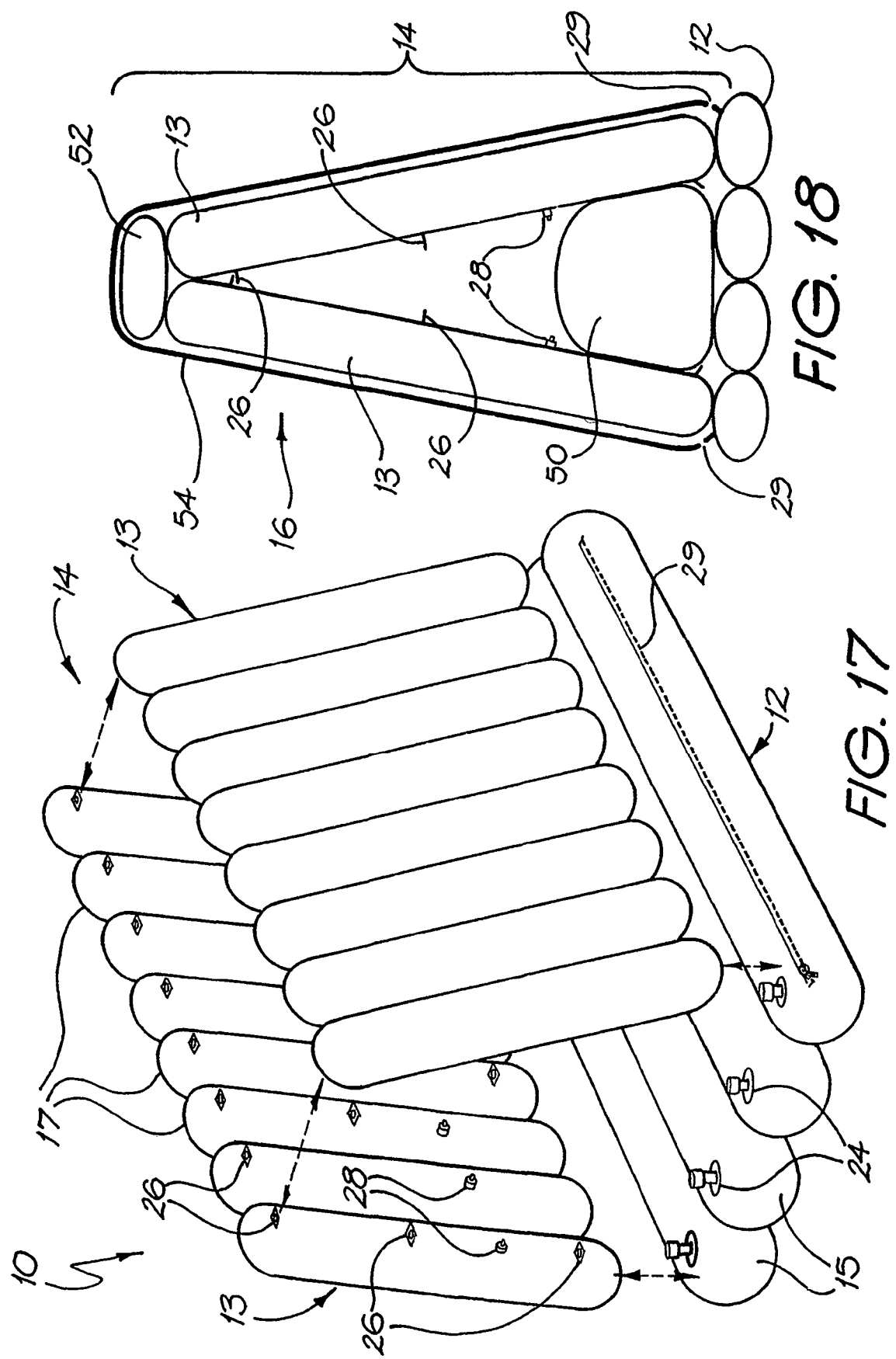

INFLATABLE APPARATUS FOR DISPLAYING VISUAL IMAGES

RELATED APPLICATIONS

This application is the U.S. National Phase of PCT/AU01/01565 filed Dec. 4, 2001 and claims priority to Australian Application PR 1888 filed Dec. 5, 2000 which is hereby incorporated by reference herein, Australian Application PR 4153 filed Apr. 2, 2001 which is hereby incorporated by reference herein, and Australian Application PR 7286 filed Aug. 27, 2001 which is hereby incorporated by reference herein.

TECHNICAL FIELD

The present invention relates to apparatus for displaying visual images and more particularly, to inflatable devices for displaying visual images and information in general, such as advertising, film projection, warnings, etc.

BACKGROUND OF THE INVENTION

Apparatus for displaying visual images such as billboards, screens and signboards in general have many various forms well-known globally and have been used to display information of all kinds. However, in general these apparatus are heavy, often permanent structures, which are difficult to transport and assemble. Screens and signage that are designed to be portable are typically restricted in size, awkward to transport, difficult to move once assembled or unable to be assembled in confined areas. Advertising billboards and signage used at motor vehicle race tracks are typically rigid structures which can potentially cause major damage and injury in the event of vehicle impact.

Inflatable apparatus in general are typically constructed of heavy materials such as canvas and are not able to be moved once inflated. These devices must be continually inflated using constant airflow to maintain their stature and require heavy or complicated means of stabilisation. Such devices do not provide a definite shape or configuration that is resilient and able to maintain a desired structure. Therefore, such devices are not appropriate for providing effective display surfaces and the potential applications of such devices are substantially limited.

OBJECT OF THE INVENTION

It is the object of the present invention to substantially overcome or at least ameliorate one or more of the disadvantages of the prior art.

SUMMARY OF THE INVENTION

Accordingly, the present invention provides apparatus for displaying a visual image, said apparatus including a device having:

an inflatable main body configured to provide at least one display face, when said main body is inflated, for displaying said visual image; and a base portion for stabilising said device.

The main body is formed from a plurality of inflatable tubular members such that, when inflated and arranged on said base portion, said members define a predetermined shape.

Preferably, said base portion is formed from one or more sealable chambers. Preferably, said sealable chambers comprise one or more of said tubular members. Preferably, a number of said tubular members are provided in the form of one or more integrally formed sheets of said tubular members. Any of said tubular members may be in direct fluid communication with others thereof or may be individually sealable. Preferably, said sheets of tubular members are formed from layers of a plastic material seam welded together to form parallel rows of said tubular members. Preferably, said base portion is adapted to be at least partially filled with water or particulate matter for stabilising said device.

In a preferred embodiment, said tubular members include exterior members, which define the dimensions of said predetermined shape, and at least one interior member which braces and supports said exterior members.

In another embodiment, said base portion is provided by at least one rigid base plate for stabilising said device. Preferably, said at least one base plate comprises a plurality of rigid base plates in hinged connection, to allow said device to be folded between said plates, when said main body is deflated.

In a preferred embodiment, said device comprises a plurality of said sheets either laced or stitched together, joined by cable ties or joined by zip mechanisms.

Preferably, said predetermined shape is a polygonal prism having a longitudinal axis. In one embodiment, said interior members are arranged parallel to said axis and extend throughout the length of said device. Alternatively, said interior members are arranged perpendicular to said axis. Preferably, planar reinforcing structures, comprising one or more of said interior tubular members, are arranged perpendicular to said axis at various intervals along the length of said device. Preferably, said reinforcing structures comprise said sheets of tubular members.

In a preferred embodiment, at least one of said tubular members is arranged in fluid communication with at least one other of said tubular members.

In a preferred embodiment, said apparatus includes an illumination source for illuminating said at least one display face. In a preferred embodiment, said device is provided with an internal cavity which may accommodate said illumination source.

In a preferred embodiment, said device is inflated using air, or alternatively, helium gas. Preferably, said base portion is at least partially filled with water, or alternatively, sand.

In a preferred embodiment, said apparatus further comprises a cover, providing said visual image, which at least partially covers said main body portion. Said cover may be removable or permanent.

Preferably, said device is configured such that at least one said display face is inclined with respect to said base portion at an angle of at least 45°, when said main body is inflated.

In a preferred embodiment, said device is configured to generally adopt the shape of a trapezoidal prism, when said main body is inflated. In another preferred embodiment, said device is configured to generally adopt the shape of a triangular prism, when said main body is inflated. In another preferred embodiment said device is configured to generally adopt the shape of a rectangular prism, when said main body is inflated.

In particular applications, said apparatus may include a source of compressed gas adapted for fluid communication with said main body. In such an application, said apparatus may also include means for regulating said source of gas. Said source of compressed gas and said regulator may be located remote from said device and communicated with said main body via a fluid line.

In a preferred embodiment, said apparatus is entrenched in the ground such that only said main body is located above the surface of the ground.

In particular applications, said apparatus may include guy ropes to secure said device.

In a preferred embodiment, said at least one display face is adapted to display visual images projected thereon, when said main body is inflated.

In a preferred embodiment, said apparatus is located at a motor vehicle race track. In another embodiment, said display face has directions and/or warnings displayed thereon. In another embodiment, said display face has a visual image in the form of advertising displayed thereon.

BRIEF DESCRIPTION OF THE DRAWINGS

Preferred forms of the present invention will now be described by way of example with reference to the accompanying drawings wherein:

FIGS. 7A and 7B are a cross sectional view, showing interior bracing members, and a side view respectively of a further apparatus.

FIGS. 8A and 8B are a cross sectional view, showing interior bracing members, and a side view respectively of a yet further apparatus.

FIG. 9 is a perspective view of one embodiment of the apparatus with a cover.

FIG. 17 is an exploded perspective view of currently preferred apparatus for displaying visual images.

FIG. 18 is an end view of the apparatus of FIG. 17 showing additional inflatable members.

DETAILED DESCRIPTION OF THE PREFERRED EMBODIMENTS

Figure 1A:
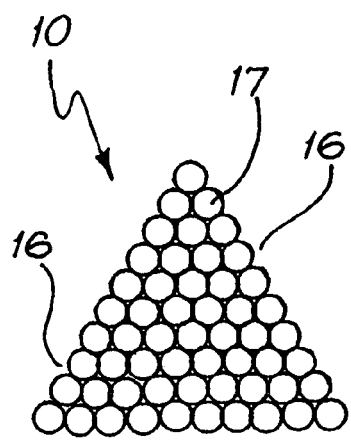
FIGS. 1A and 1B are a cross sectional view and a side view respectively of an apparatus for displaying visual images.
Figure 1B:
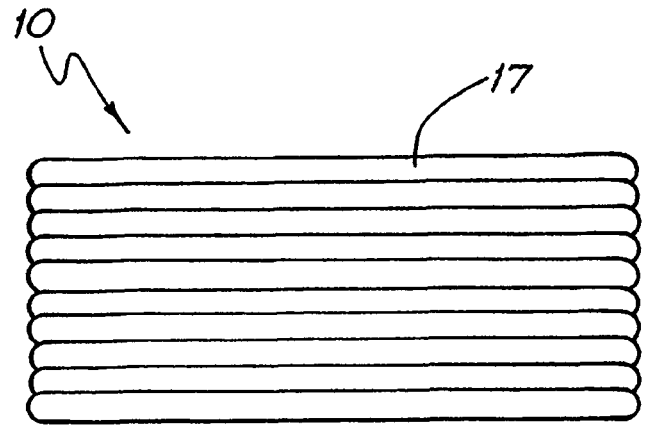
Figure 2A:
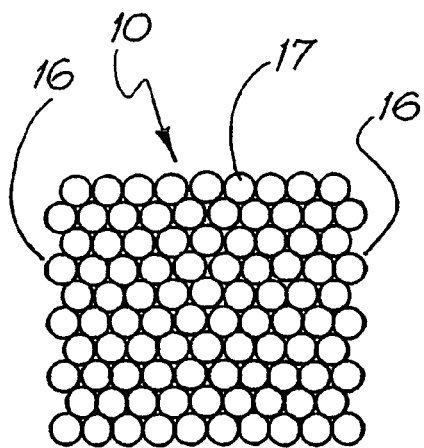
FIGS. 2A and 2B are a cross sectional view and a side view respectively of a further apparatus for displaying visual images.
Figure 2B:
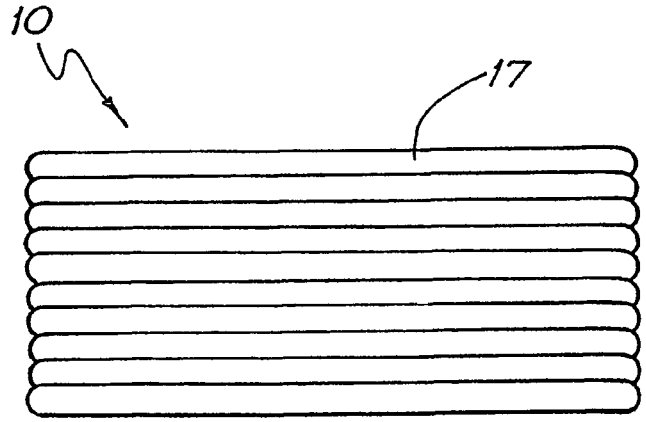

Referring to FIGS. 1A, 1B, 2A and 2B, an apparatus for displaying visual images includes an inflatable device 10 having an inflatable main body 14 configured to provide at least one display face 16 for displaying visual images when the main body 14 is inflated. The device further comprises a base portion 12, which is adapted to stabilize the device 10. The device 10 comprises a plurality of inflatable tubular members 17, which form the main body 14 and the base portion 12 and which are arranged and fixed together such that, when the tubular members 17 are inflated, the device 10 adopts a predetermined shape providing the at least one display face 16. The predetermined shape is most preferably a triangular prism or a rectangular prism, having a longitudinal axis. The tubular members 17 of the base portion 12 can be filled with water or sand, in order to stabilize the device 10. The tubular members 17 comprise exterior members 18, which define the dimensions of the predetermined shape, and interior members 19, which brace and support the exterior members 18. As depicted in FIGS. 1A and 2A, the exterior members 18 and the interior members 19 may be arranged parallel to the longitudinal axis of the prism and may completely fill the interior of the device 10.

The device may comprise a plurality of modular elements joined by cable ties, zip mechanisms, hook and loop type fasteners, stitching or seam welding. The modular elements may be formed in various shapes and sizes to provide various shapes of the device 10. However, the modular elements preferably comprise sheets of integrally formed tubular members 17. Typically, the sheets of tubular members 17 are formed from layers of a plastic material seam welded together to form parallel rows of tubular members 17, similar to inflatable mattresses.

Figure 3A:
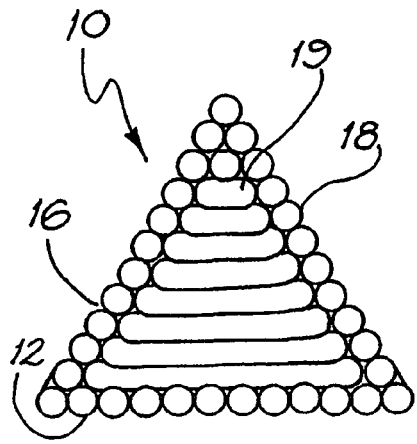
FIGS. 3A and 3B are a cross sectional view, showing interior bracing members, and a side view respectively of a further apparatus.
Figure 3B:
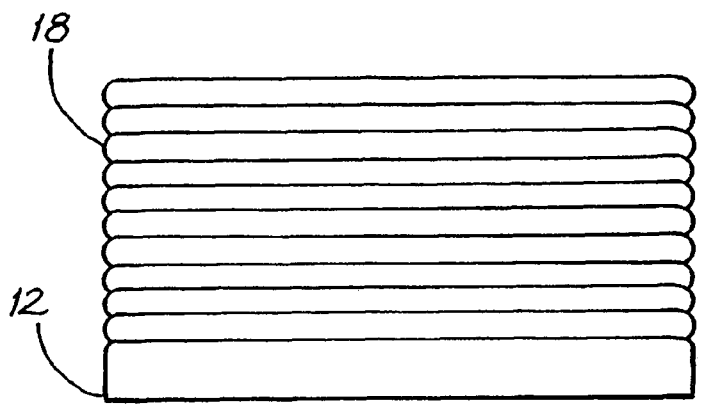
Figure 5:
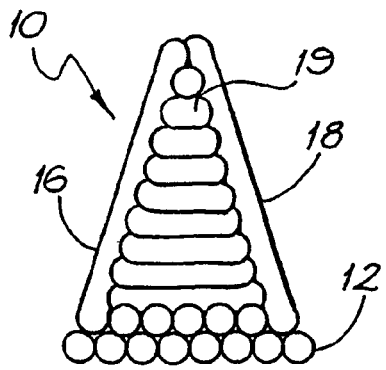
FIG. 5 is a cross sectional view of an alternative arrangement of the bracing members and the base portion members of the apparatus.
Figure 6:
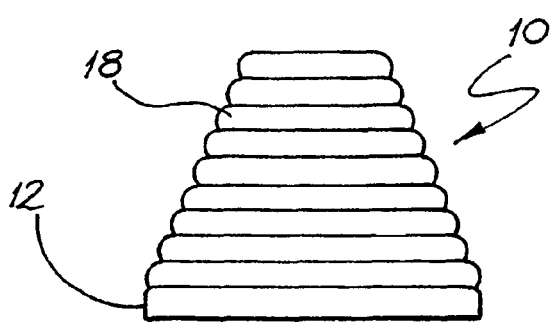
FIG. 6 is a side view of an alternative apparatus for displaying visual images.

Referring to FIG. 3A, the interior members 19 may be arranged perpendicular to the longitudinal axis of the prism. In this arrangement, planar reinforcing structures are provided by sheets of the interior tubular members 19, which lie in planes perpendicular to the prism axis. These sheets are preferably spaced at various intervals along the length of the device 10. As depicted in FIG. 5, the tubular members 17 of the base portion 12 may comprise both interior 19 and exterior 18 members.

Figure 4A:
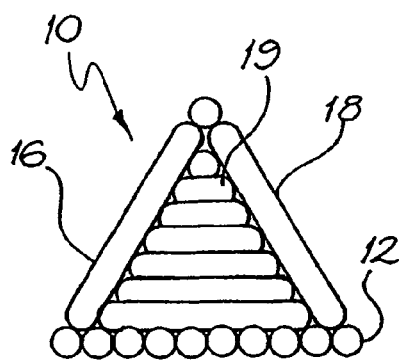
FIGS. 4A and 4B are a cross sectional view, showing interior bracing members, and a side view respectively of a still further apparatus.
Figure 4B:
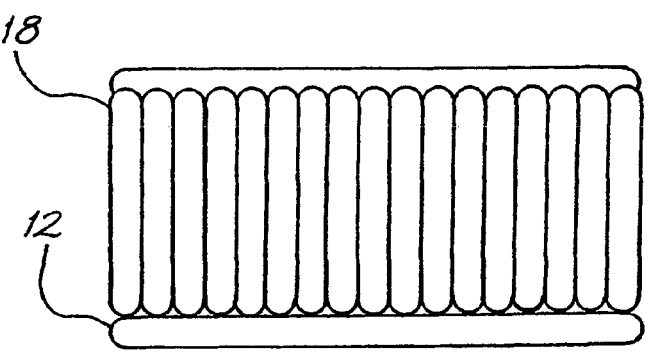

As depicted in FIGS. 4A and 4B, a number of the exterior members 18 may be arranged perpendicular to the prism axis, while others are arranged parallel to the axis. Various combinations are envisaged including the possibility of tubular members being arranged in any orientation.

As depicted in FIG. 8B, some of the tubular members 17 may be arranged in a honeycomb-like structure.

Each of the tubular members 17 may be integrally formed and/or in fluid communication with one or more other tubular members 17. The device 10 may have a single inflation point, which would simplify the inflation of the device 10, or several inflation points so that, in the event of a puncture, the device 10 would not completely deflate.

Air is the preferred gas for inflating the main body 14 as it is cheap and readily available. However, helium having a lower relative density and being inert may be preferred in certain applications, although it is more expensive and difficult to contain. Other gases may also be used to suit different applications. The pressure to which the tubular members 17 are typically inflated is approximately 5 to 6 psi (30 to 45 kPa).

The display faces 16 may be configured in various ways to display the visual images thereon. The faces 16 of the device 10 may have information and/or images printed directly thereon or printed on separate material, which may be removably attached by attachment means, such as a hook and loop type tape fastener, provided on the device 10. As depicted in FIG. 9, the device 10 may be provided with a removable cover 13 having images thereon, such that the images may be altered merely by replacing the cover 13. Alternatively, the faces 16 may be adapted to display visual images projected thereon or adapted to display images when illuminated by a light source, which may be located internally or externally of the device 10. If an illumination source is to be located internally of the device 10, the main body 14 would typically be made of a transparent material.

The above embodiments provide a light-weight rigid structure, which is easily erected and transportable. These embodiments provide a display face which will not bulge or sag, which increases the effectiveness of the visual image displayed. The stabilising base portion allows the device to stand independently of any securing mechanisms, such as guy ropes, in normal use.

Figure 10:
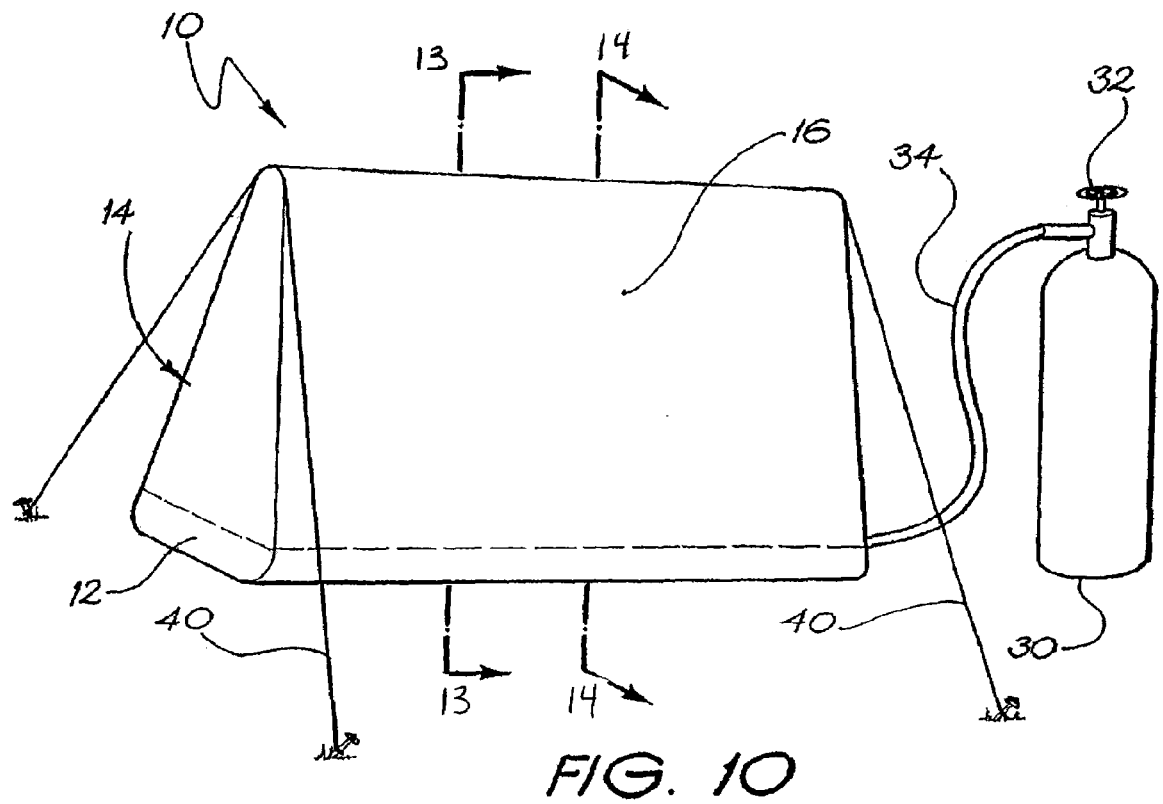
FIG. 10 is a perspective view of an apparatus for displaying visual images.
Figure 11:
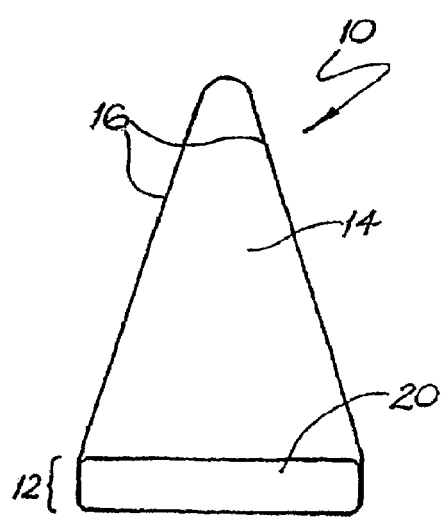
FIG. 11 is a sectional view along line A—A of FIG. 10.

Referring to FIGS. 10 and 11, an apparatus for displaying visual images includes a device 10 having a base portion 12 and an inflatable main body 14 configured to provide at least one substantially planar and generally upstanding face 16 for receiving the visual images, when the main body 14 is inflated. The base portion 12 comprises at least one sealable chamber 20 as a means for stabilising the device 10. The chamber 20 can be filled with water or a particulate material such as sand. The device 10 is configured to generally adopt the shape of a trapezoidal or triangular prism, when said main body 14 is inflated. The device 10 may also be configured to adopt other shapes such as a rectangular prism or pyramid. The main body 14 will typically be formed of tubular members as per the device of FIGS. 1 to 9.

In most applications, it is envisaged that the device 10, once inflated, would stand alone. However, in certain situations such as environments involving large temperature or pressure changes, the internal pressure may need to be regulated. In such applications, the apparatus may further include a source of compressed gas 30, a gas regulator 32 and a fluid line 34, in fluid communication therewith. The fluid line 34 is sealingly engageable with the main body 14 to provide communication between the gas source 30 and the main body 14 for inflation of the main body 14. While in most conditions it is envisaged that the base portion 12 will provide sufficient stability, in high wind conditions, it may be necessary to provide additional stabilising means. Accordingly, the apparatus may further include guy ropes 40 to further stabilise the device 10.

The regulator 32 can be used to adjust the pressure of the gas in the main body 14, as conditions such as temperature change over time, to ensure that the main body 14 remains fully inflated. Alternatively, the fluid line 34 may be detached and the main body 14 sealed after inflation.

Figure 12:
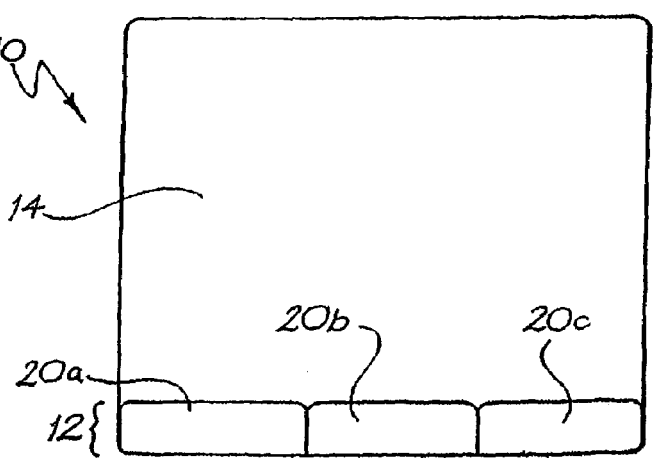
FIG. 12 is a sectional view along line B—B of FIG. 10.

As shown in FIG. 12, the base portion 12 may include a number of separate sealable chambers 20a, 20b, 20c, which may be filled with liquid or a particulate matter such as sand. As such, the base portion 12 may be folded between each chamber 20a, 20b, 20c, when the main body 14 is deflated. This facilitates transport and storage of the device 10 as it can be easily folded into a compact configuration even when the chambers are at least partially filled with water or sand. In such applications, the base portion 12 may be constructed from a heavy canvas or plastic to increase stability.

Figure 13:
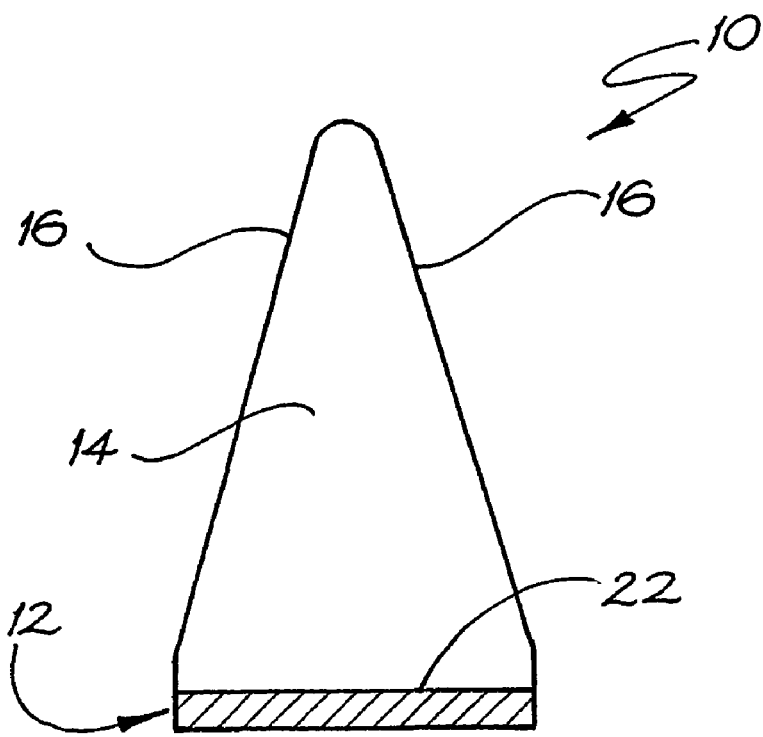
FIG. 13 is a sectional view along line A—A of FIG. 10 depicting an alternate configuration to that of FIG. 11.
Figure 14:
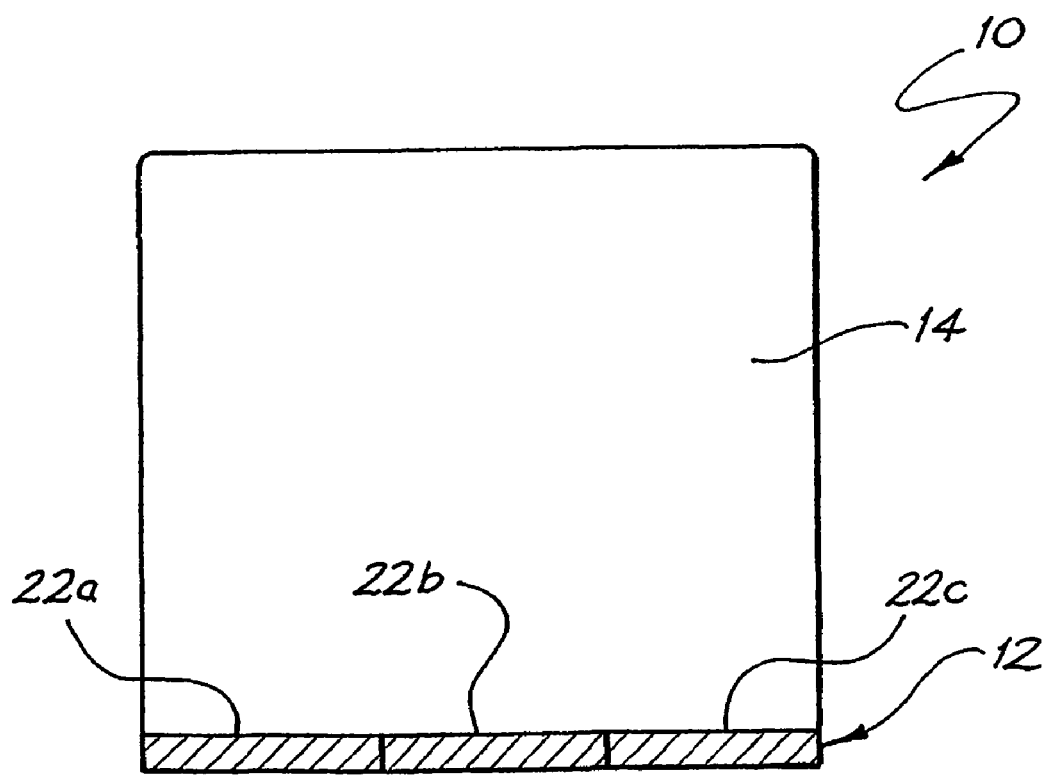
FIG. 14 is a sectional view along line B—B of FIG. 10 depicting the configuration of FIG. 13.

In another apparatus depicted in FIGS. 13 and 14, the base portion 12 includes at least one rigid base plate 22 as a means for stabilising the device 10. The base plate 22 may be divided into a number of smaller individual plates 22a, 22b, 22c in hinged connection, such that the base portion 12 may be folded up along with the main body 14, when the main body 14 is deflated, to facilitate transport and storage of the device 10.

For applications in which there is a possibility or likelihood of something impacting the device, the apparatus, including the compressed gas source 30 and regulator 32, may be entrenched in the ground such that only the main body 14 of the device 10 is located above the surface of the ground. Such applications would typically include advertising at motor vehicle and motorcycle racing venues and also at equestrian events. The compressed gas source 30 and regulator 32 may be located away from the device 10 and gas supplied to the main body 14 by the fluid line 34. In the event of a collision with the apparatus, only the inflatable main body 14 would be impacted, reducing the risk of serious damage or injury.

In other applications, the apparatus may be used for displaying warnings or directions of emergency services, such as police directions at an accident scene. The apparatus may also be used to provide a barricade which may include a number of the devices placed end to end. In such applications, the compact apparatus may be stored in a vehicle's luggage compartment and easily arranged and inflated when necessary. The apparatus may also be used to provide divider walls for temporary establishments such as trade shows and exhibitions. In such applications, the device may be constructed of a light weight material and filled with air so that the device is self supporting. The device may be located by means such as clips on the floor or by being tied to the floor, which are simpler and lighter than restraints used for conventional dividers.

In its simplest form, the device 10 may consist of a light, flexible and air tight material such as plastic, preferably polyvinylchlorate (PVC). However, as the applications and environment conditions in which the apparatus may be used can vary substantially, the materials of which the device 10 is constructed many vary accordingly. Heavier more durable material may be used for larger applications and for extreme weather conditions such as lined canvas or other fabric. As the size of the device 10 and type of material vary, the pressure required within the inflated main body 14 will also vary accordingly, with higher pressures required for larger, heavier constructions.

The apparatus may also include means for recompressing the gas when deflating the device 10, so that the same gas can be reused in a subsequent application.

Figure 15:
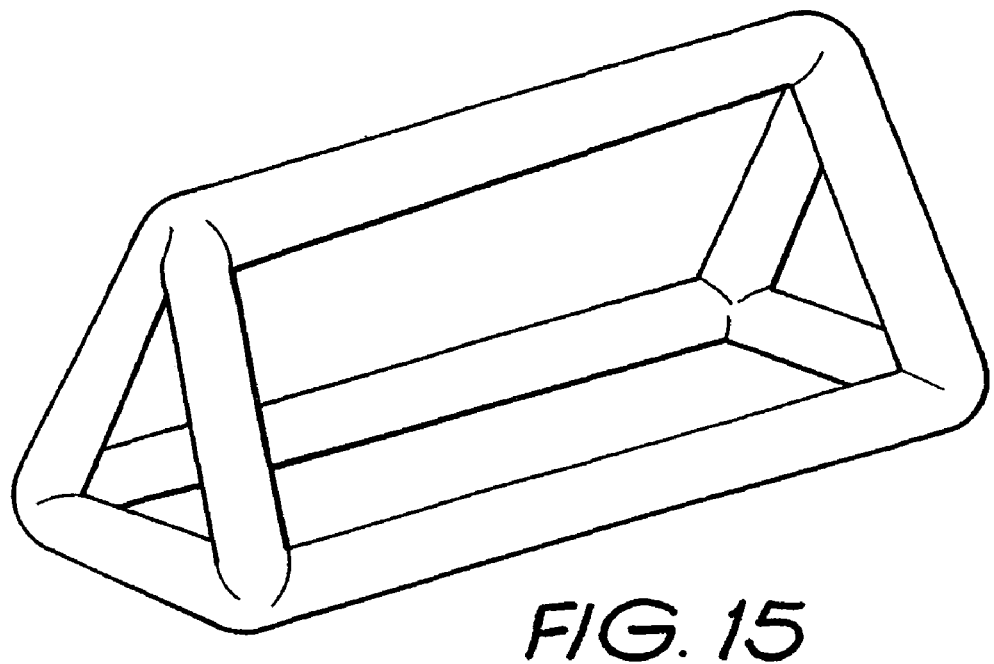
FIGS. 15 and 16 are perspective views of further examples of apparatus for displaying visual images.
Figure 16:
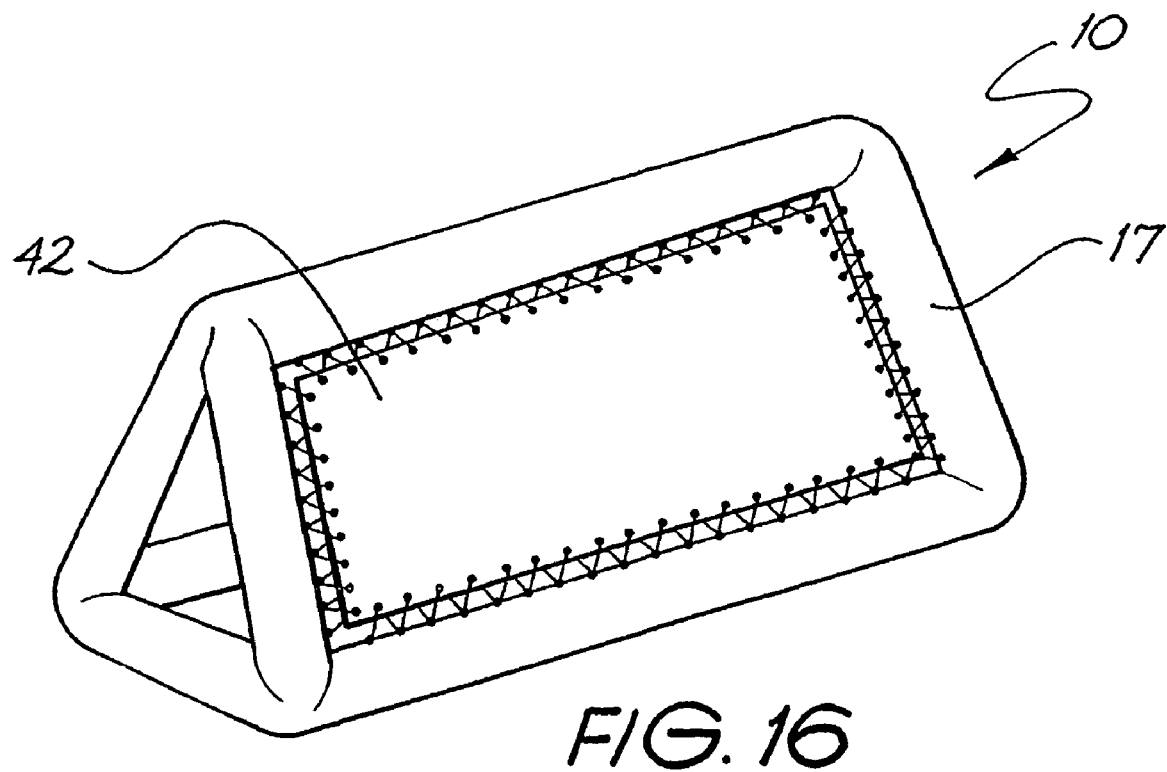

Referring to FIG. 15, an alternative version of the device 10, comprising a plurality of inflatable tubular members 17, may simply form a basic framework over which a cover (not shown) is placed to display the visual image. Alternatively, as depicted in FIG. 16, panels of fabric 42 may be secured to the framework by lacing or other means, to display the visual image. In this embodiment, the fabric panels 42 may act as stress members and assist in stiffening the device 10.

A particularly preferred form of the device 10 is depicted in FIGS. 17 and 18. The main body portion 14 includes two lateral sheets 13 of integrally formed tubular members 17. The base portion 12 includes a single sheet of integrally formed tubular members 15. Due to the buoyancy of the device 10 of this and other embodiments, the apparatus may be adapted to locate the device on water, by means of attachment to a buoy or other means of anchoring.

The tubular members 17 of the main body portion 14 are provided with inflation points 28 and attachment points 26. Each of the tubular members 17 is separately inflatable via the inflation points 28. Attachment points 26 are adapted to receive cable ties or lacing to attach the two lateral sheets 13 of the main body portion 14. The tubular members 15 of the base portion 12 are provided with fluid supply points 24.

When assembling this embodiment of the device 10, each of the tubular members 15 of the base portion 12 is partially filled with water via an externally threaded port at each of said fluid supply points 24. Screw-threaded caps, each housing a valve, are threadably secured over each port. Each of the tubular members 15 can then be further inflated with pressurised air via the valves to ensure rigidity of the base portion 12. The material of the tubular members 15 of the base portion 12 will typically be formed from a suitably heavy duty material to protect against rough handling of the device 10 being dragged along the ground, or alternatively the base portion 12 might be encased in a separate cover of protective heavy duty material to avoid handling damage.

Each of the tubular members 17 of the lateral sheets 13 are inflated with pressurised air via valves provided at the inflation points 28. Once inflated, the lateral sheets 13 are laced together with cable ties at attachment points 26 along a top side of each lateral sheet 13. The attached lateral sheets 13 are arranged to rest on the base portion 12 as shown in FIG. 17 to form a generally triangular prism. It is not necessary to directly secure the main body portion 14 to the base portion 12, although if desired, the main body 14 and base portion 12 may be secured to one another at additional attachment points.

The base portion 12 is also provided with zip mechanisms 29 provided along opposite edges of the base portion 12, to attach a cover 54 providing a visual image. The cover is placed over the main body portion 14 and attached via the zip mechanisms 29 to the base portion 12. The cover 54, when attached by the zip mechanisms 29, acts to maintain the main body portion 14 relative to the base portion 12.

The preferred embodiment of the device 10 further includes an elongate inflatable bladder 50. The bladder 50 is placed between the base portion 12 and the two lateral sheets 13 of the main body portion 14 and extends the length of the device 10. The bladder 50 is inflated after the cover 54 has been attached and forces the lateral sheets 13 outwards, stretching the cover 54 so as to provide a taut, flat surface for displaying the visual image. The device 10 may further include an elongate inflatable auxiliary member 52. The auxiliary member 52 is arranged above the two lateral sheets 13 of the main body portion 14 and extends the length of the device 10. The auxiliary member 52 is inflated after the cover 54 has been attached and acts to further stretch the cover 54.

What is claimed is:

1. Apparatus displaying a visual image, said apparatus extending in a longitudinal direction and comprising:
    a stabilization base portion for stabilizing said apparatus, said base portion having a front side, a back side, a first lateral side extending in said longitudinal direction between the front and back sides and an opposing second lateral side extending in said longitudinal direction between the front and back sides;
    a first sheet of parallel, inflatable and separately sealable tubular members, each said tubular member of said first sheet of tubular members extending perpendicular to said longitudinal direction from a first lateral edge of said first sheet of tubular members to an opposing second lateral edge of said first sheet of tubular members, each of said tubular members of said first sheet of tubular members being respectively arranged adjacent each other in a side by side configuration;
    a second sheet of parallel inflatable and separately sealable tubular members, each said tubular member of said second sheet of tubular members extending perpendicular to said longitudinal direction from a first lateral edge of said second sheet of tubular members to a second lateral edge of said second sheet of tubular members, each of said tubular members of said second sheet of tubular members being respectively arranged adjacent each other in a side by side configuration;
    a cover defining a display face and having a first lateral edge extending in said longitudinal direction and an opposing second lateral edge extending in said longitudinal direction; and
    a visual image displayed on said display face;
    wherein said first sheet of tubular members is arranged on said base portion with said first lateral edge of said first sheet of tubular members extending parallel and adjacent to said first lateral side of said base portion, said second sheet of tubular members is arranged on said base portion with said first lateral edge of said second sheet of tubular members extending parallel and adjacent to said second lateral side of said base portion, and said second lateral edge of said first sheet of tubular members extends parallel, and attached to said second lateral edge of said second sheet of tubular members, such that said base portion and said first and second sheets of tubular members define a structure with a generally triangular cross-section, in a plane perpendicular to said longitudinal direction,
    further wherein, said first lateral edge of said cover is secured to said first lateral side of said base portion and said cover extends over said first and second sheets of tubular members with said second lateral edge of said cover being secured to said second lateral side of said base portion.

2. The apparatus of claim 1 wherein said first and second sheets of tubular members are tied to each other and to said base portion.

3. The apparatus of claim 1 wherein said first sheet and said second sheet of tubular members are each inclined with respect to said base portion at an angle of at least 45 degrees.

4. The apparatus of claim 1 wherein said base portion comprises a third sheet of parallel inflatable and separately sealable tubular members, each of said tubular members of said third sheet of tubular members being respectively arranged adjacent each other in a side by side configuration, each said tubular member of said third sheet of tubular members being at least partially filled with water or particulate matter for stabilizing said apparatus.

5. The apparatus of claim 1 wherein said base portion comprises at least one rigid base plate.

6. The apparatus of claim 1 wherein said base portion comprises a plurality of hinged base plates in hinged connection.

7. The apparatus of claim 1 further comprising an auxiliary inflatable member, located above said second lateral edge of said first sheet of tubular members, above said second lateral edge of said second sheet and below said cover, for tensioning said cover.

8. The apparatus of claim 1 further comprising guy ropes extending from each of said first sheet and said second sheet of tubular members.

9. The apparatus of claim 1 wherein said visual image is an advertisement.

* * * * *